(12) United States Patent (10) Patent No.: US 7,877,398 B2
Kroeschel et al. (45) Date of Patent: Jan. 25, 2011

(54) MASKING RELATED SENSITIVE DATA IN GROUPS

(75) Inventors: William Kroeschel, Jackson, NJ (US); Arvind Sathi, Englewood, CO (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 11/942,081

(22) Filed: Nov. 19, 2007

(65) Prior Publication Data

US 2009/0132575 A1 May 21, 2009

(51) Int. Cl.
 *G06F 17/30* (2006.01)
(52) U.S. Cl. .................... 707/757; 707/758
(58) Field of Classification Search ........ 707/757, 707/758
 See application file for complete search history.

(56) References Cited

U.S. PATENT DOCUMENTS

| | | | |
|---|---|---|---|
| 5,323,464 A | | 6/1994 | Elander et al. |
| 6,678,678 B2* | | 1/2004 | Lee et al. .................. 707/999.2 |
| 7,007,025 B1 | | 2/2006 | Nason et al. |
| 7,170,999 B1 | | 1/2007 | Kessler et al. |
| 7,200,757 B1 | | 4/2007 | Muralidhar et al. |
| 7,243,340 B2 | | 7/2007 | Tobin |
| 7,499,986 B2* | | 3/2009 | Axberg et al. ............... 709/221 |
| 7,752,215 B2* | | 7/2010 | Dettinger et al. ............ 707/757 |
| 2003/0217272 A1 | | 11/2003 | Agrawal et al. |
| 2004/0139253 A1* | | 7/2004 | Perego et al. ................ 710/71 |
| 2004/0139288 A1* | | 7/2004 | Perego et al. ............... 711/154 |
| 2004/0181670 A1 | | 9/2004 | Thune et al. |
| 2004/0250100 A1 | | 12/2004 | Agrawal et al. |
| 2005/0015558 A1* | | 1/2005 | Evans et al. ................. 711/154 |
| 2005/0232020 A1* | | 10/2005 | Perego et al. ............ 365/185.22 |
| 2006/0041656 A1* | | 2/2006 | Li et al. ...................... 709/223 |
| 2006/0179075 A1 | | 8/2006 | Fay |
| 2007/0073926 A1* | | 3/2007 | Perego et al. ................ 710/29 |
| 2007/0091378 A1* | | 4/2007 | Ren ........................ 358/426.13 |

(Continued)

OTHER PUBLICATIONS

Carnival description; In CodePlex Project Directory [online]; Microsoft Corporation; Retrieved from the Internet: < URL: http://www.codeplex.com/carnival/Wiki/Print.aspx?title=Home&version=18&action=Print > [Retrieved Jul. 16, 2007]; 2 pages.

(Continued)

*Primary Examiner*—Charles Rones
*Assistant Examiner*—Rezwanul Mahmood
(74) *Attorney, Agent, or Firm*—Schmeiser, Olsen & Watts; Anna L. Linne (57) ABSTRACT

A method and system of masking a group of related data values. A record in an unmasked data file of n records is read. The record includes a first set of data values of data elements included in a related data group (RDG) and one or more data values of one or more data elements external to the RDG. A random number k is received. A second set of data values is retrieved from a lookup table that associates n key values with n sets of data values. Retrieving the second set of data values includes identifying that the second set of data values is associated with a key value of k. The n sets of data values are included in the umnasked data file's n records. The record is masked by replacing the first set of data values with the retrieved second set of data values.

16 Claims, 9 Drawing Sheets

U.S. PATENT DOCUMENTS

| | | | |
|---|---|---|---|
| 2007/0110224 A1* | 5/2007 | Gumpel et al. | 380/28 |
| 2007/0299881 A1* | 12/2007 | Bouganim | 707/200 |
| 2009/0204631 A1* | 8/2009 | Pomroy et al. | 707/102 |
| 2010/0042643 A1* | 2/2010 | Pattabhi et al. | 707/102 |
| 2010/0076988 A1* | 3/2010 | Kenedy et al. | 707/757 |
| 2010/0086126 A1* | 4/2010 | Yokota et al. | 380/28 |
| 2010/0205189 A1* | 8/2010 | Ebrahimi et al. | 707/757 |

OTHER PUBLICATIONS

Anonymous Data for Test Oracle HR Schemas; Net 2000 Ltd. 2005; 15 pages.

Data Masker by Net 2000 Ltd. [online]; Retrieved from the Internet: < URL: http://www.Datamasker.com/datamasker_kf.pdf >; 1 page.

Data Masker for SQL Server Quick Start Guide; The Data Masker Safe, Relevant Test Data [online]; Net 2000 Ltd.; Retrieved from the Internet: < URL: http://datamasker.com/DMS/HelpFiles/QuickStartGuide.htm >; [Retrieved Jul. 16, 2007]; 4 pages.

Rupa Parameswaran: A Robust Data Obfuscation Approach for Privacy Presereving Collaborative Filtering; A Thesis Presented to The Academic Faculty; School of Electrical and Computer Engineering Georgia Institute of Technology Aug. 2006; 138 pages.

\* cited by examiner

UNMASKED DATA FILE

| Cust # | Eff Date | Addr1 | Addr2 | City | County | State | Zip | Geographic code |
|---|---|---|---|---|---|---|---|---|
| 123 | 101087 | PO Box 3 | | Los Angeles | Los Angeles | CA | 90007-0000 | 0105752491255 |
| 145 | 081493 | 10 Main Street | Office3 | Chicago | Cook | IL | 60609-1123 | 0114874552872 |
| 236 | 121402 | 6 Elm Street | | Old Bridge | Middlesex | NJ | 08857-1221 | 0117459284771 |
| 299 | 100101 | 23 10th Ave | Apt 5D | Dallas | Dallas | TX | 75205-4466 | 0135274911621 |
| 355 | 060897 | RR #6 | | Leesburg | Loudoun | VA | 20176-0774 | 0147374291733 |
| 357 | 052395 | 2340 Ryan Road | | Hillsborough | Somerset | NJ | 08873-6441 | 0117849274972 |
| 569 | 013104 | 1 Atlantic Ave | 3rd floor | Miami | Dade | FL | 33131-9999 | 0112847221855 |
| 660 | 041500 | 3 Pacific Ave | Apt 21 | Boston | Suffolk | MA | 02215-5333 | 0115958227300 |
| 891 | 030100 | 14 Overlook Rd | | Laguna Beach | Orange | CA | 92651-2356 | 0105847719035 |

*FIG. 4A*

LOOKUP TABLE

| Key | Addr1 | Addr2 | City | County | State | Zip | Geographic code |
|---|---|---|---|---|---|---|---|
| 1 | PO Box 3 | | Los Angeles | Los Angeles | CA | 90007-0000 | 0105752491255 |
| 2 | 10 Main Street | Office3 | Chicago | Cook | IL | 60609-1123 | 0114874552872 |
| 3 | 6 Elm Street | | Old Bridge | Middlesex | NJ | 08857-1221 | 0117459284771 |
| 4 | 23 10th Ave | Apt 5D | Dallas | Dallas | TX | 75205-4466 | 0135274911621 |
| 5 | RR #6 | | Leesburg | Loudoun | VA | 20176-0774 | 0147374291733 |
| 6 | 2340 Ryan Road | | Hillsborough | Somerset | NJ | 08873-6441 | 0117849274972 |
| 7 | 1 Atlantic Ave | 3rd floor | Miami | Dade | FL | 33131-9999 | 0112847221855 |
| 8 | 3 Pacific Ave | Apt 21 | Boston | Suffolk | MA | 02215-5333 | 0115958227300 |
| 9 | 14 Overlook Rd | | Laguna Beach | Orange | CA | 92651-2356 | 0105847719035 |

UNMASKED DATA FILE (100-b)

| Cust # | Eff Date | Addr1 | Addr2 | City | County | State | Zip | Geographic code |
|---|---|---|---|---|---|---|---|---|
| . . . | . . . | . . . | . . . | . . . | . . . | . . . | . . . | . . . |
| 145 | 081493 | 10 Main Street | Office3 | Chicago | Cook | IL | 60609-1123 | 0114874552872 |
| . . . | . . . | . . . | . . . | . . . | . . . | . . . | . . . | . . . |

418

LOOKUP TABLE (404)

| Key | Addr1 | Addr2 | City | County | State | Zip | Geographic code |
|---|---|---|---|---|---|---|---|
| 1 | PO Box 3 | | Los Angeles | Los Angeles | CA | 90007-0000 | 0105752491255 |
| 2 | 10 Main Street | Office3 | Chicago | Cook | IL | 60609-1123 | 0114874552872 |
| 3 | 6 Elm Street | | Old Bridge | Middlesex | NJ | 08857-1221 | 0117459284771 |
| 4 | 23 10th Ave | Apt 5D | Dallas | Dallas | TX | 75205-4466 | 0135274911621 |
| 5 | RR #6 | | Leesburg | Loudoun | VA | 20176-0774 | 0147374291733 |
| 6 | 2340 Ryan Road | | Hillsborough | Somerset | NJ | 08873-6441 | 0117849274972 |
| 7 | 1 Atlantic Ave | 3rd floor | Miami | Dade | FL | 33131-9999 | 0112847221855 |
| 8 | 3 Pacific Ave | Apt 21 | Boston | Suffolk | MA | 02215-5333 | 0115958227300 |
| 9 | 14 Overlook Rd | | Laguna Beach | Orange | CA | 92651-2356 | 0105847719035 |

420 / 422

MASKED DATA FILE (424)

| Cust # | Eff Date | Addr1 | Addr2 | City | County | State | Zip | Geographic code |
|---|---|---|---|---|---|---|---|---|
| 123 | 101087 | 1 Atlantic Ave | 3rd floor | Miami | Dade | FL | 33131-9999 | 0112847221855 |
| 145 | 081493 | 23 10th Ave | Apt 5D | Dallas | Dallas | TX | 75205-4466 | 0135274911621 |

426

MASKED DATA FILE 428

| Cust # | Eff Date | Addr1 | Addr2 | City | County | State | Zip | Geographic code |
|---|---|---|---|---|---|---|---|---|
| 123 | 101087 | 1 Atlantic Avenue | 3rd floor | Miami | Dade | FL | 33131-9999 | 0112847221855 |
| 145 | 081493 | 23 10th Ave | Apt 5D | Dallas | Dallas | TX | 75205-4466 | 0135274911621 |
| 236 | 121402 | PO Box 3 | | Los Angeles | Los Angeles | CA | 90007-0000 | 0105752491255 |
| 299 | 100101 | 3 Pacific Ave | Apt 21 | Boston | Suffolk | MA | 02215-5333 | 0115958227300 |
| 355 | 060897 | RR #6 | | Leesburg | Loudoun | VA | 20176-0774 | 0147374291733 |
| 357 | 052395 | 2340 Ryan Road | | Hillsborough | Somerset | NJ | 08873-6441 | 0117849274972 |
| 569 | 013104 | 14 Overlook Rd | | Laguna Beach | Orange | CA | 92651-2356 | 0105847719035 |
| 660 | 041500 | 10 Main Street | Office3 | Chicago | Cook | IL | 60609-1123 | 0114874552872 |
| 891 | 030100 | 6 Elm Street | | Old Bridge | Middlesex | NJ | 08857-1221 | 0117459284771 |

MASKING RELATED SENSITIVE DATA IN GROUPS

RELATED APPLICATION

This application is related to U.S. patent application Ser. No. 11/940,401, filed on Nov. 15, 2007.

FIELD OF THE INVENTION

The present invention relates to a computer-implemented method and system for obfuscating data values, and more particularly to a data masking technique for masking groups of related sensitive data values.

BACKGROUND OF THE INVENTION

Conventionally, a first group of related data values that need to be masked is replaced with a second group of valid data values that are selected from values external to the universe of data that includes the first group. The selection of such external values to mask the first group results in an application inaccurately processing the masked data values. Such inaccurate processing is caused by the application exercising logical paths that are different from the logical paths employed when the unmasked data values are processed. Furthermore, conventional masking methods applied to a first data value (e.g., a street address) in a set of related data values (e.g., street address, city, state) in an unmasked group of data values, where the set of related data values is mapped to a second data value (e.g., a geographic code) in the unmasked group, provide a masked group that includes a syntactically equivalent, but logically invalid substitute for the first data value. The logically invalid substitute is no longer related by the mapping to the second data value, thereby causing application logic applied to the masked group to fail, even though the logic had been successfully tested with the unmasked group. Known techniques to address the aforementioned inaccurate processing and logic failure include: (1) developing a separate version of the application code that tests unique scenarios related to the usage of the masked data values; and (2) creating a new set of fictitious test data that provides full test case coverage. Technique (1) requires additional development time and testing that is expensive in terms of labor and computing resources. Technique (2) requires a costly creation of realistic data from scratch. Thus, there exists a need to overcome at least one of the preceding deficiencies and limitations of the related art.

SUMMARY OF THE INVENTION

The present invention provides a computer-implemented method of masking a group of related data values, comprising:

reading, by a computing system, a record of a set of n records included in an unmasked data file, wherein the unmasked data file is a set of input to a software application, and wherein the record includes a first plurality of data values of a plurality of data elements included in a related data group and one or more data values of one or more data elements that are external to the related data group, receiving, by the computing system, a randomly generated number k;

retrieving, by the computing system and from a lookup table, a second plurality of data values of the plurality of data elements included in the related data group, wherein the lookup table associates n key values with n pluralities of data values in a one-to-one correspondence, wherein the n pluralities of data values include the second plurality of data values, wherein the n pluralities of data values are included in the n records in a one-to-one correspondence, wherein the retrieving includes identifying the second plurality of data values as being associated with a key value of k included in the n key values; and masking the record by the computing system, wherein the masking of the record includes replacing the first plurality of data values in the record with the second plurality of data values.

A system, computer program product, and a process for supporting computing infrastructure that provides at least one support service corresponding to the above-summarized method are also described and claimed herein.

Advantageously, the present invention provides a data masking technique for a group of related sensitive data that allows an application to accurately process the masked data without requiring coding changes in the application. Further, the present invention allows testing rules developed for the unmasked data to be applied unchanged to the masked data. Still further, the data masking technique disclosed herein masks values in a related data group with a single table lookup, thereby providing a masking scheme that is computationally fast. Further yet, if the universe of related data groups is fixed and known in advance, the present invention can be applied on-the-fly for real-time applications.

DETAILED DESCRIPTION OF THE INVENTION

Overview

The present invention provides a technique that may include masking a first set of sensitive data values of data elements included in a related data group (RDG) in unmasked data by replacing the first set of sensitive data values with a second set of data values. The second set of data values may be randomly selected from multiple sets of data values of the RDG, where each set of the multiple sets of data values is included in the universe of data that includes the first set of sensitive data values. The result of the replacement of the first set of sensitive data values of an RDG with the randomly selected second set may be masked data that is stored in a masked data file. The aforementioned replacement is referred to herein as a relational group swap. The relational group swap disclosed herein may allow an application to accurately process the masked data without requiring changes to the application code and without requiring changes to testing rules developed for the unmasked data.

As used herein, a related data group (a.k.a. relational group) is defined to be a group that includes related data elements that when coupled together form a unique piece of data on which application logic depends to exercise the application logic's task. As used herein, related data elements are defined to be data elements related by rules exercised in application software (i.e., a value of one of the related data elements has a dependency on one or more values of one or more of the other related data elements). As one example, in a related data group consisting of City, State, and ZIP Code, the validity of a ZIP Code value is dependent upon a City, State value pair. When combined into a set of data, related data elements form a unique piece of data that is used by one or more validation rules exercised in a software application. For instance, a validation rule validates a set of data that includes a credit card's account number, cardholder name, and expiration date. In this example, decoupling the cardholder name or the expiration date from the credit card account number invalidates the full set of data.

As used herein, a set of sensitive data values is defined to be a set of data values that has a security risk that exceeds a predetermined risk level, even though each data value in the set of data values may or may not have a security risk that exceeds the predetermined risk level. That is, the data values in a set of sensitive data values collectively have the aforementioned security risk.

System for Masking Related Data in Groups

Figure 1:
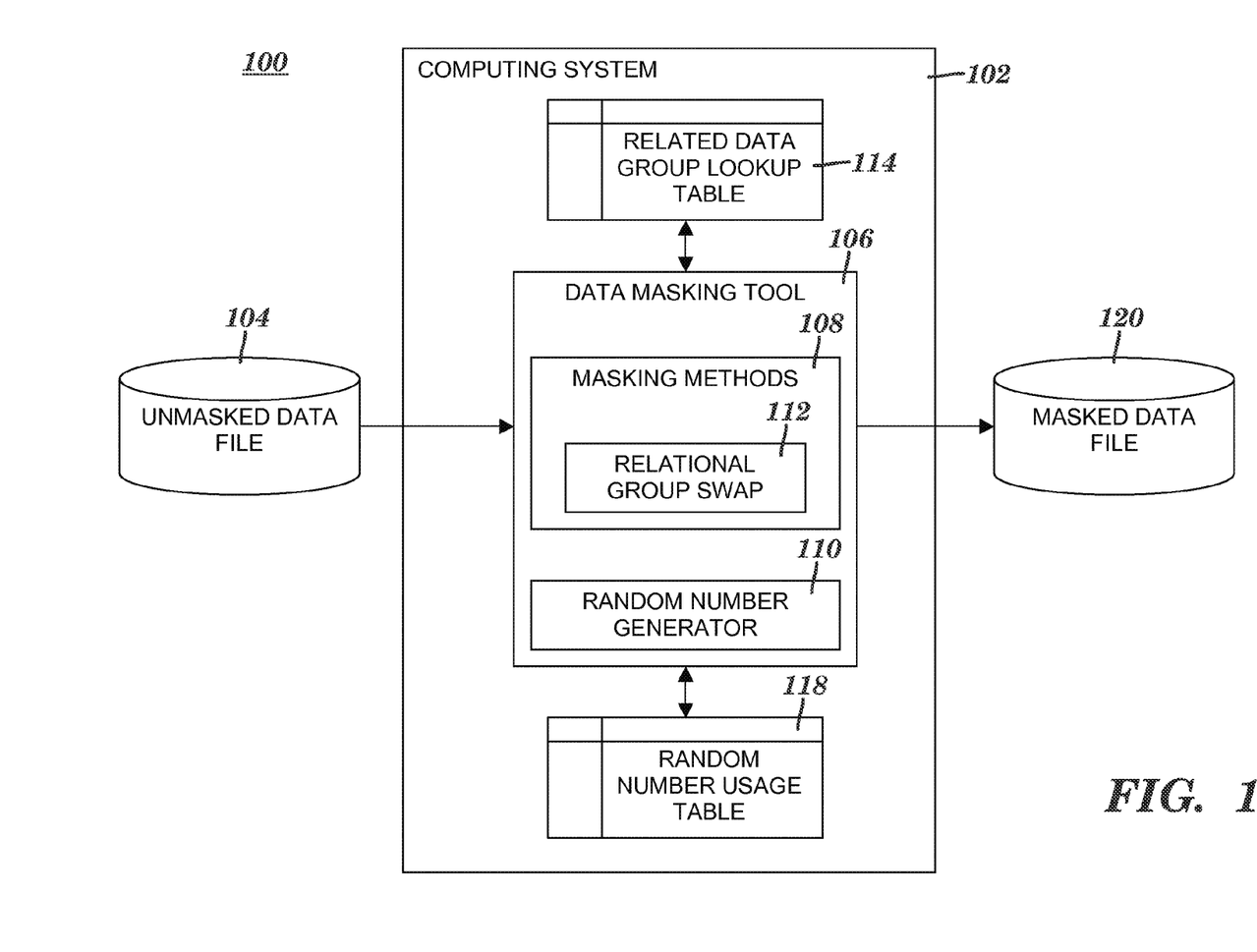
FIG. 1 is a block diagram of a system for masking related data in groups, in accordance with embodiments of the present invention.

FIG. 1 is a block diagram of a system 100 for masking related data in groups, in accordance with embodiments of the present invention. System 100 includes a computing system 102 and an unmasked data file 104 (a.k.a. unmasked file). Unmasked data file 104 includes a plurality of records. Each record in unmasked data file 104 includes unmasked data values. The unmasked data values in a record in file 104 include a set of sensitive data values of data elements included in a related data group. Each record in unmasked data file 104 also includes one or more other data values which are external to the related data group. The one or more data values external to the related data group are also referred to herein as parent data. The one or more data elements associated with the parent data are also referred to herein as parent data elements. The parent data may or may not include a sensitive data value that needs to be masked.

Computing system 102 includes a software-based data masking tool 106, which includes a plurality of masking methods 108. Masking methods 108 include software that executes masking algorithms to obfuscate unmasked data that data masking tool 106 receives from unmasked data file 104. Data masking tool 106 also includes a random number generator 110. One of the masking methods 108 is implemented by relational group swap software 112, which utilizes random number generator 110 to perform a relational group swap (see the process of FIG. 3 described below). System 100 also includes a related data group lookup table 114 and a random number usage table 118. Tables 114 and 118 are utilized by relational group swap software 112 to perform a relational group swap (see the process of FIG. 3 described below). Furthermore, system 100 includes a masked data file 120 (a.k.a. masked file), which includes masked data. Masked data in file 120 is the result of unmasked data included in file 104 being transformed by masking methods 108. Masked data in file 120 includes the result of relational group swap software 112 transforming sets of sensitive data values associated with the related data group of file 104 into corresponding sets of desensitized data values. As used herein, a set of desensitized data values is defined to be a set of data values that has eliminated a security risk by being decoupled from parent data, where the security risk had been associated with a corresponding set of sensitive data values and had exceeded a predetermined risk level. That is, the data values in a set of desensitized data values collectively do not have the aforementioned security risk. Further descriptions of the functionality of the components of system 100 are included in the discussions below relative to FIG. 2 and FIG. 3.

Process for Masking Related Data in Groups

Figure 2:
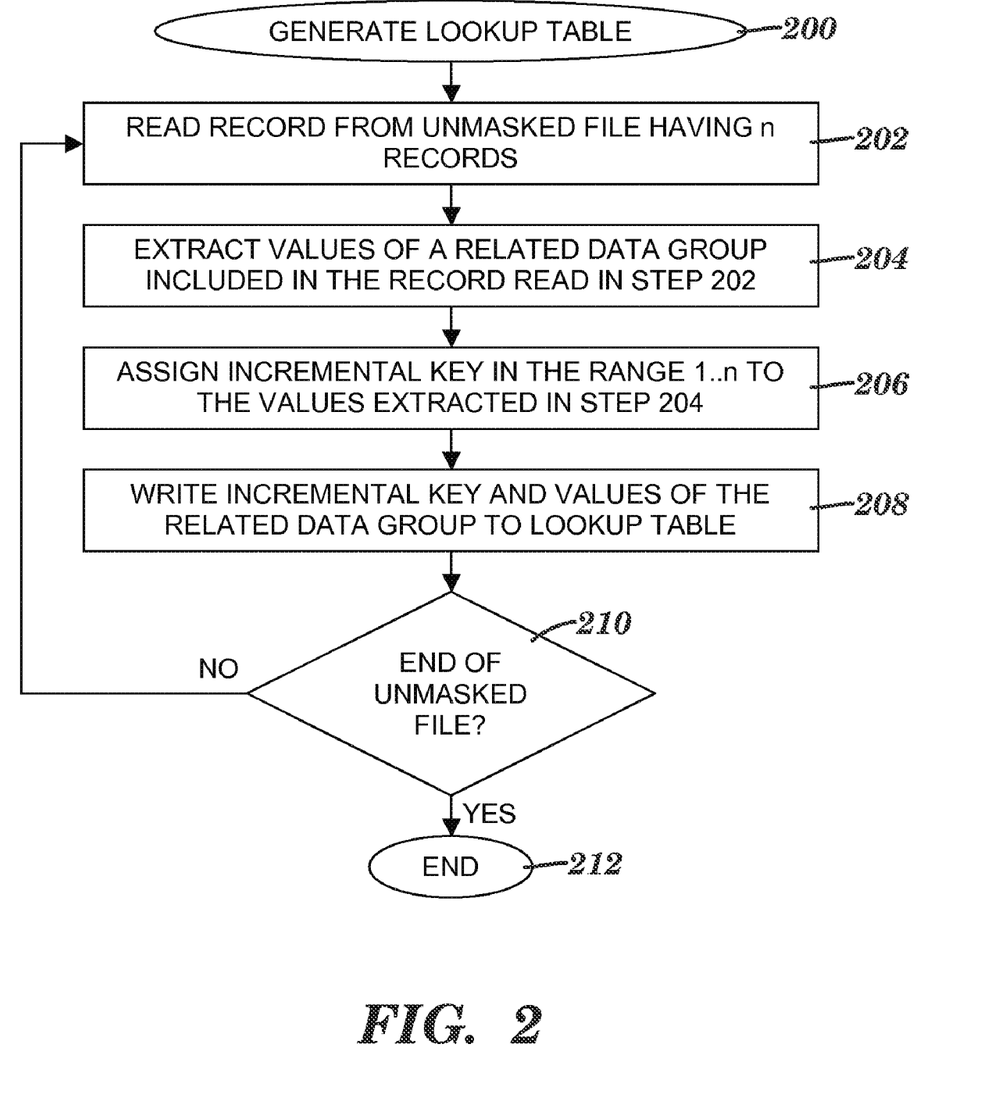
FIG. 2 is a flow diagram of a process of generating a lookup table included in the system of FIG. 1, in accordance with embodiments of the present invention.

FIG. 2 is a flow diagram of a process of generating a lookup table included in the system of FIG. 1, in accordance with embodiments of the present invention. The lookup table generation process begins at step 200. In step 202, data masking tool 106 (see FIG. 1) reads a record of the n records included in unmasked data file 104 (see FIG. 1). Each of the n records in unmasked data file 104 (see FIG. 1) includes a set of sensitive data values of data elements included in a related data group. Hereinafter, a set of data values of data elements included in a related data group is also referred to as related data group values. In step 204, data masking tool 106 (see FIG. 1) extracts the related data group values that are included in the record read in step 202.

In step 206, data masking tool 106 (see FIG. 1) assigns an incremental key (a.k.a. key value) in the range 1 . . . n (i.e., 1≦key value≦n) to the set of data values extracted in step 204. In one embodiment, step 206 in a first iteration of the process of FIG. 2 assigns a first key value as a pre-defined initial value (e.g., 1) and each subsequent iteration of the process of FIG. 2 assigns a key value that results from modifying the key value assigned in the previous iteration by a pro-defined adjustment value (e.g., incrementing the key value of the previous iteration by one). For example, using an initial value of 1 and an adjustment value that increments the previous key value by 1, four iterations of the process of FIG. 2 assign the following key values in the specified order: 1, 2, 3, 4. In one embodiment, the maximum key value assigned in the last iteration of the process of FIG. 2 is equal to the number of records in unmasked data file 104 (see FIG. 1).

In step 208, data masking tool 106 (see FIG. 1) writes the incremental key assigned in step 206 and the related data group values extracted in step 204 to a record of lookup table 114 (see FIG. 1). Thus, the record of the lookup table written to in step 208 stores the value of the key assigned in step 206 together with a corresponding set of data values, which are the related data group values extracted in step 204. If data masking tool 106 (see FIG. 1) determines in inquiry step 210 that the end of the unmasked data file 104 (see FIG. 1) has been reached (i.e., the last record in the unmasked data file was read in step 202), then the lookup table process ends at step 212; otherwise, the next iteration of the process of FIG. 2 begins with the next record in the unmasked data file being read in step 202. The next iteration of the process of FIG. 2 continues with processing the next record in the unmasked data file in steps 204 and 206 and writing the result of the processing to the next record of lookup table 114 (see FIG. 1) in step 208.

In one embodiment, prior to the start of the process of FIG. 2, one or more members of an IT support team (e.g., an application subject matter expert) determines which data values in unmasked data file 104 (see FIG. 1) need to be masked and which data elements in the unmasked data file are included in the related data group referenced above relative to FIG. 2. The determination of which data elements are included in the related data group facilitates determining a required size of lookup table 114 (see FIG. 1).

Figure 3:
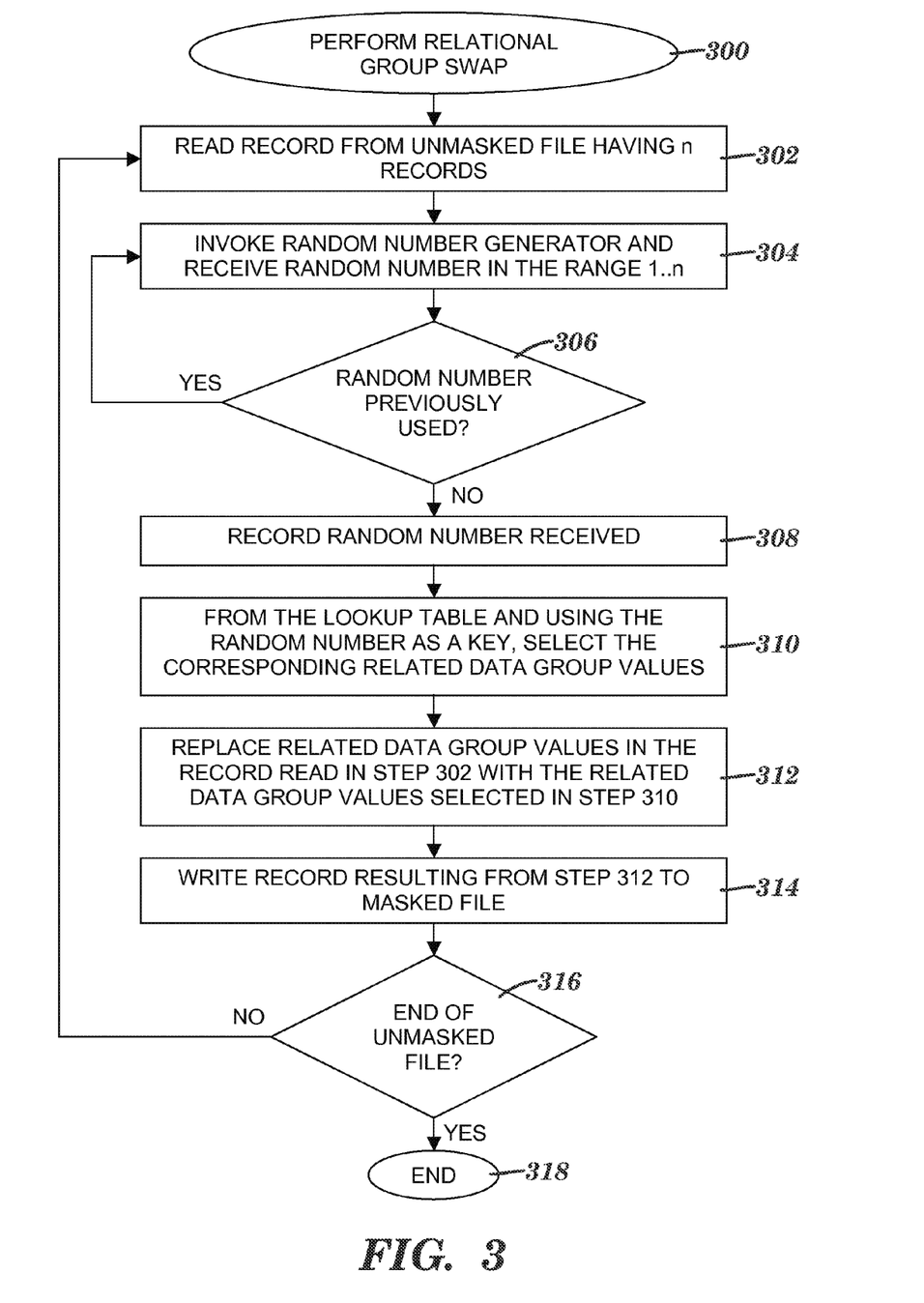
FIG. 3 is a flow diagram of a relational group swap process implemented by the system of FIG. 1, in accordance with embodiments of the present invention.

FIG. 3 is a flow diagram of a relational group swap process implemented by the system of FIG. 1, in accordance with embodiments of the present invention. The relational group swap process begins at step 300. In step 302, relational group swap software 112 (see FIG. 1) reads a record of the n records included in unmasked data file 104 (see FIG. 1). The record read in step 302 includes (1) a set of sensitive related data group values and (2) one or more data values of data elements that are external to the related data group. In each record of the unmasked data file 104 (see FIG. 1), the related data group values are coupled to at least one sensitive or non-sensitive parent data value of a data element that is external to the related data group. For example, data values of Address, City, State and ZIP Code data elements included in a related data group are coupled to a parent data value of a Customer No. data element, which is not included in the related data group.

In step 304, relational group swap software 112 (see FIG. 1) invokes random number generator 110 (see FIG. 1) to generate a random number in the range 1 . . . n. For example, random number generator 110 (see FIG. 1) generates an initial random number, a modulo operation having the initial random number as the dividend and n as the divisor is applied to obtain a remainder in the range 0 . . . (n−1), and one is added to the remainder to generate a final random number in the desired range 1 . . . n. Relational group swap software 112 (see FIG. 1) receives the generated random number in step 304.

If relational group swap software 112 (see FIG. 1) determines in step 306 that the random number received in step 304 was used in a previous iteration of the relational group swap process (i.e., the Yes branch of step 306), then the process of FIG. 3 repeats starting at 304 with a next invocation of the random number generator 110 (see FIG. 1) to generate a next random number that is received by relational group swap software 112 (see FIG. 1); otherwise, the process of FIG. 3 continues with step 308. Relational group swap software 112 (see FIG. 1) accesses random number usage data stored in random number usage table 118 (see FIG. 1) to determine whether the random number received in step 304 was used in a previous iteration of the relational group swap process. Such random number usage data is stored in table 118 (see FIG. 1) in step 308, which is described below.

The Yes branch of step 306 is also taken if relational group swap software 112 (see FIG. 1) determines that lookup table 114 (see FIG. 1) associates a key equal to the random number received in step 304 with related data group values that are identical to the related data group values included in the record read in step 302.

In step 308, relational group swap software 112 (see FIG. 1) records random number usage data (i.e., the random number received in step 304) in random number usage table 118 (see FIG. 1). In step 310, relational group swap software 112 (see FIG. 1) uses the random number received in step 304 as a key to select and retrieve related data group values in lookup table 114 (see FIG. 1). That is, relational group swap software 112 (see FIG. 1) selects and retrieves the related data group values in lookup table 114 (see FIG. 1) that correspond to a key value that is indicated by (e.g., is equal to) the random number received in step 304.

In step 312, relational group swap software 112 (see FIG. 1) replaces the related data group values in the record read in step 302 with the related data group values selected in step 310. The result of step 312 is a record that includes the one or more data values that are external to the related data group in the record read in step 302 along with the related data group values selected in step 310. Furthermore, the record resulting from step 312 excludes the related data group values that were read in step 302.

In step 314, relational group swap software 112 (see FIG. 1) writes the record resulting from step 312 to masked data file 120 (see FIG. 1). If relational group swap software 112 (see FIG. 1) determines in inquiry step 316 that the end of unmasked data file 104 (see FIG. 1) has been reached (i.e., the last record in the unmasked data file was read in step 302), then the relational group swap process ends at step 318; otherwise, a next iteration of the process of FIG. 3 repeats steps 302-316, beginning with the next record in the unmasked data file being read in step 302. The aforementioned next iteration includes generating and receiving a next random number in the range 1 . . . n in step 304, processing the next random number in steps 306 and 308, retrieving from lookup table 114 (see FIG. 1) in step 310 a next set of related data group values that correspond to the aforementioned next random number, and replacing in step 312 the related data group values that were read in step 302 with the aforementioned next set of related data group values retrieved from the lookup table. The aforementioned next iteration and any subsequent iterations of the process of FIG. 3 writes a new record to masked data file 120 (see FIG. 1) in step 314, where the new record is the result of the replacement performed in step 312.

At the end of the relational group swap process at step 318, masked data file 120 (see FIG. 1) is complete and includes n records (i.e., the number of records in unmasked data file 104 of FIG. 1). Each record in the completed masked data file includes related data group values that are decoupled from the aforementioned at least one parent data value to which the related data group values were coupled in the unmasked data file 104 (see FIG. 1). That is, the related data group values in masked data file 120 (see FIG. 1) cannot be traced back to the parent data value(s) that the related data group values were originally associated with in unmasked data file 104 (see FIG. 1). Because of the aforementioned decoupling from parent data value(s), the related data group values in masked data file 120 (see FIG. 1) are desensitized data values.

In one embodiment (see, e.g., FIGS. 4A-4E and the related discussion below), the parent data included in unmasked data file 104 (see FIG. 1) does not require masking. In another embodiment (not shown), the parent data included in unmasked data file 104 (see FIG. 1) requires masking by another masking method (i.e., a masking method other than the relational group swap method) that is included in masking methods 108 (see FIG. 1). In one example, an interim memory storage area in computing system 102 (see FIG. 1) is employed to store the initially read related data group values and parent data values, to replace the related data group values via the above-described relational group swap method, and to mask the parent data values via the other masking method. The aforementioned masking of the parent data is performed independently of the relational group swap masking performed in the process of FIG. 3. For example, the masking of the parent data may be performed prior to the start of the relational group swap process or subsequent to the completion of the relational group swap process.

In one embodiment, multiple records in unmasked data file 104 (see FIG. 1) include duplicate sets of data values of the related data group. If the number of such multiple records exceeds 50% of the total number of records in unmasked data file 104 (see FIG. 1), then the relational group swap method is not viable and an alternate approach may be implemented. Such alternate approaches may include, for example: (1) selecting a masking method other than the relational group swap method; (2) replacing the set of related data group values read from the unmasked data file with a duplicate set of related data group values; and (3) allowing a re-use of previously used random numbers to select previously used sets of related data group values up to a pre-defined maximum occurrence threshold while still preventing the replacement of a set of related data group values with a duplicate set of related data group values.

EXAMPLE

Figure 4A:
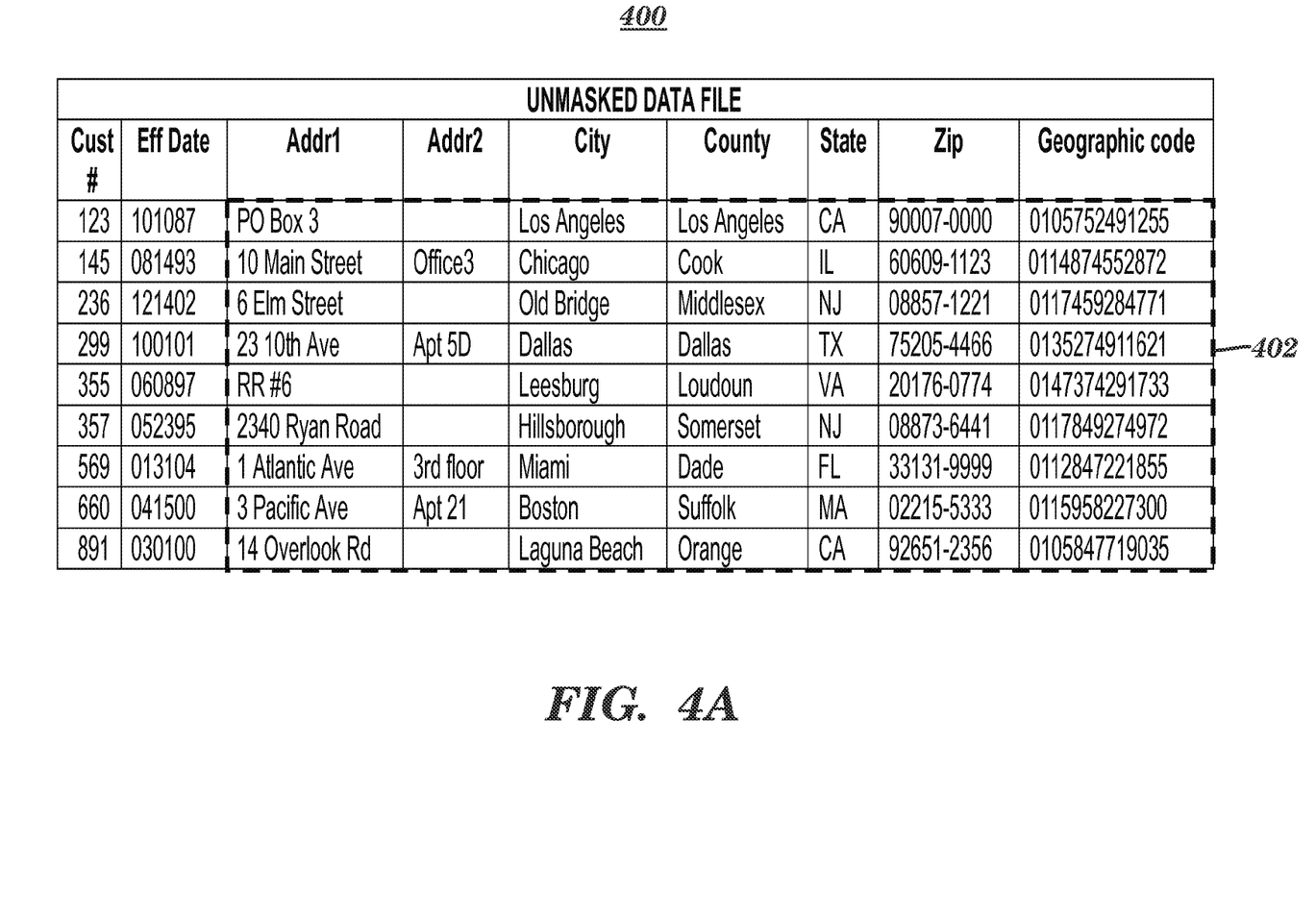
FIG. 4A depicts an exemplary unmasked data file whose records are read in the processes of FIG. 2 and FIG. 3, in accordance with embodiments of the present invention.

FIGS. 4A-4E illustrate a process of masking nine sets of related data group values contained in nine records included in an unmasked data file. FIG. 4A depicts an exemplary unmasked data file 400 whose nine records are read in the processes of FIG. 2 and FIG. 3, in accordance with embodiments of the present invention. Unmasked data file 400 is an example of unmasked data file 104 (see FIG. 1). Each row of data in unmasked data file 400 is a record. The related data group included in unmasked data file 400 is the following group of data elements: Addr1, Addr2, City, County, State, Zip and Geographic code. Addr1 and Addr2 include data values associated with an address. The Addr1, Addr2, City, County, State and Zip data elements map to the Geographic code data element. Nine sets of related data group values 402 is the entire set of sensitive data values included in the related data group in unmasked data file 400. For example, the second set of data values of the related data group is the set of the following values: 10 Main Street, Office3, Chicago, Cook, Ill., 60609-1123 and 0114874552872, which are the values of the data elements Addr1, Addr2, City, County, State, Zip and Geographic code, respectively. The non-sensitive parent data elements that are external to the related data group are the customer number (i.e., Cust #) and the effective date (i.e., Eff Date). In unmasked data file 400, the data elements Addr1, Addr2, City, County, State, Zip and Geographic Code are coupled to the parent data elements Cust # and Eff Date.

In step 202 of FIG. 2, one of the records of unmasked data file 400 is read. For example, in the first iteration of the process of FIG. 2, the record having the customer number of 123 (i.e., the first row of data in file 400) is read in step 202 (see FIG. 2). Subsequent iterations of the process of FIG. 2 read subsequent records of unmasked data file 400 sequentially.

Figure 4B:
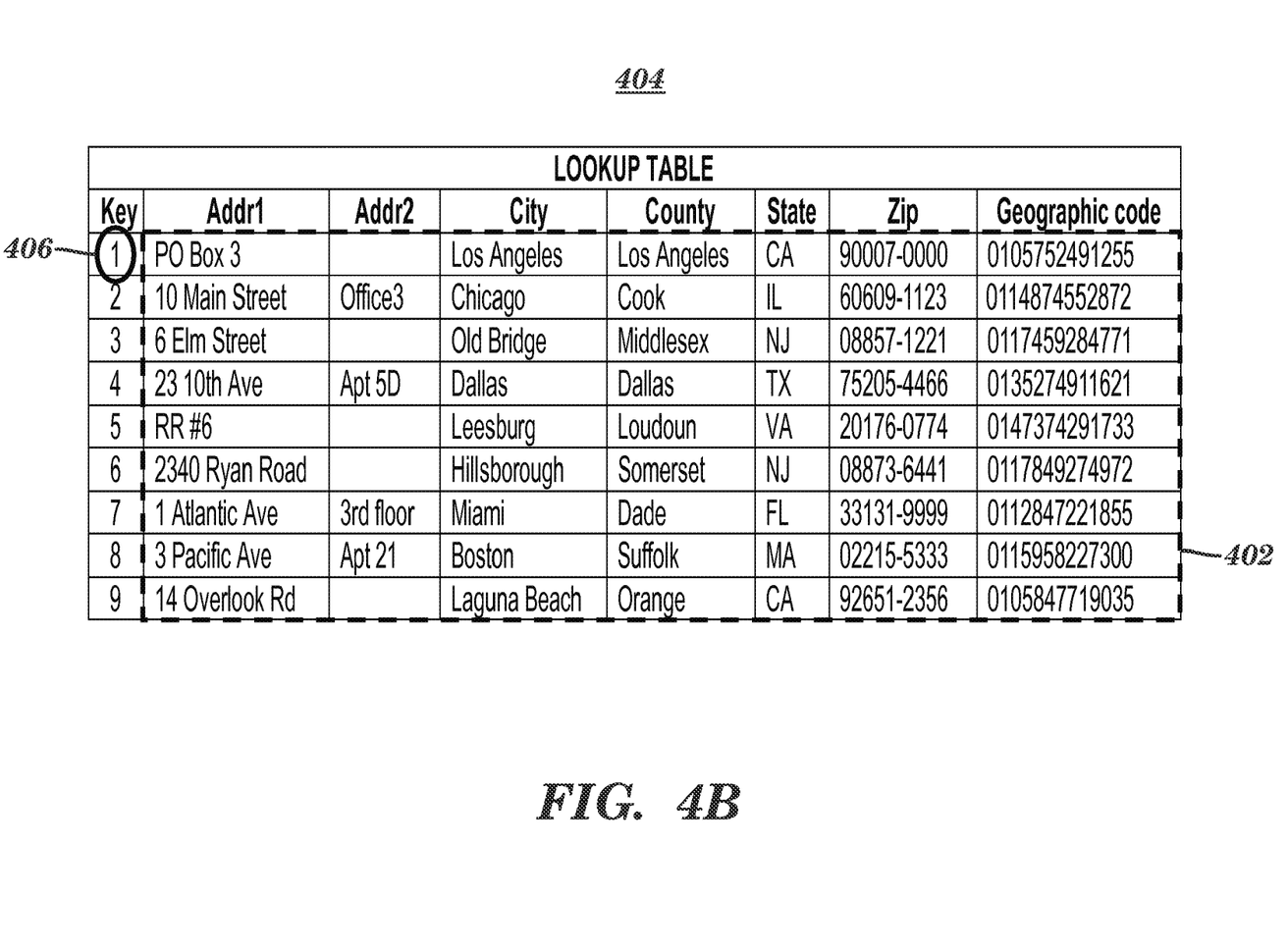
FIG. 4B depicts an exemplary lookup table generated in the process of FIG. 2, in accordance with embodiments of the present invention.

FIG. 4B depicts an exemplary lookup table 404, which is an example of lookup table 114 (see FIG. 1). The result of the process of FIG. 2 is lookup table 404, which includes nine data rows. The data rows of lookup table 404 are populated sequentially by step 208 of FIG. 2 and include sequentially ordered key values 1 through 9 and the nine sets of related data group values 402 that correspond to the key values. For each record read in step 202 (see FIG. 2), a data row of lookup table 404 is populated with a sequentially incremented key value and the related data group values in the record that was read in step 202 (FIG. 2). The key value of a data row in lookup table 404 is an index to the set of related data group values in the data row. For example, the key value of 7 in lookup table 404 is an index to the following set of related data group values: [1 Atlantic Ave, 3rd floor, Miami, Dade, Fla., 33131-9999, 0112847221855]. The maximum key value (i.e., 9) in lookup table 404 is equal to the number of records in unmasked data file 400 (see FIG. 4A).

Figure 4C:
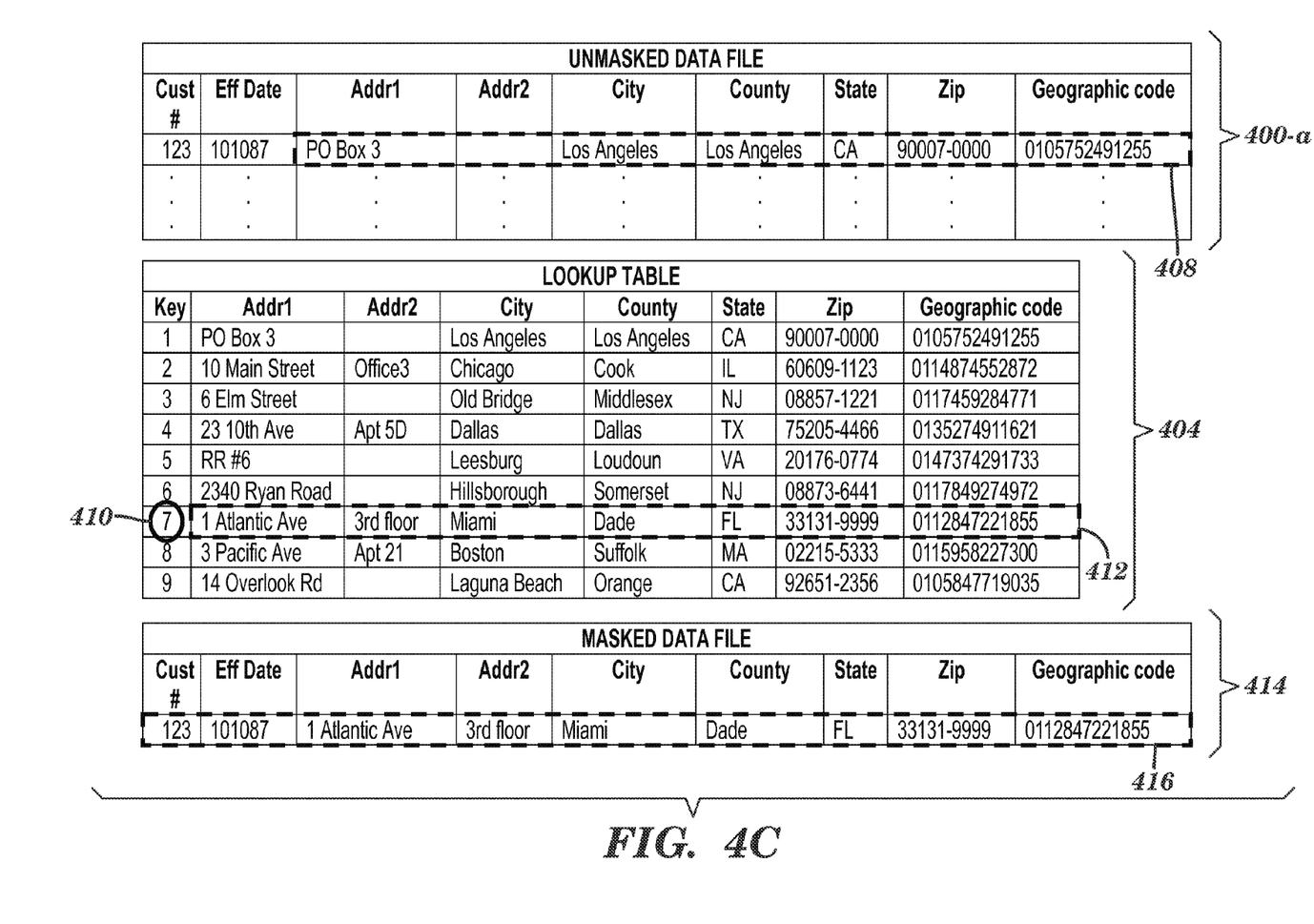
FIG. 4C depicts a replacement of related data group values in a first record of the unmasked data file of FIG. 4A, where the replacement is included in the process of FIG. 3, in accordance with embodiments of the present invention.

FIG. 4C depicts a replacement of related data group values in a first record of the unmasked data file of FIG. 4A, where the replacement is included in the process of FIG. 3, in accordance with embodiments of the present invention. Excerpt 400-a of unmasked data file 400 (see FIG. 4A) shows the first record read by step 302 (see FIG. 3) (i.e., the record corresponding to the customer number of 123), which includes related data group values 408. In step 304 (see FIG. 3), a random number of 7 is generated by random number generator 110 (see FIG. 1) and is received by data masking tool 106 (see FIG. 1). Relational group swap software 112 (see FIG. 1) uses the random number 7 as a key 410 (i.e., index value) to select and retrieve related data group values 412 from lookup table 404 in step 310 (see FIG. 3).

Masked data file 414 is populated with a first record 416, which is created from the record shown in excerpt 400-a by excluding the related data group values 408 and replacing the excluded related data group values 408 with related data group values 412. Replacing values 408 with values 412 occurs in step 312 (see FIG. 3) and the storing of record 416 in masked data file 414 occurs in step 314 (see FIG. 3).

Figure 4D:
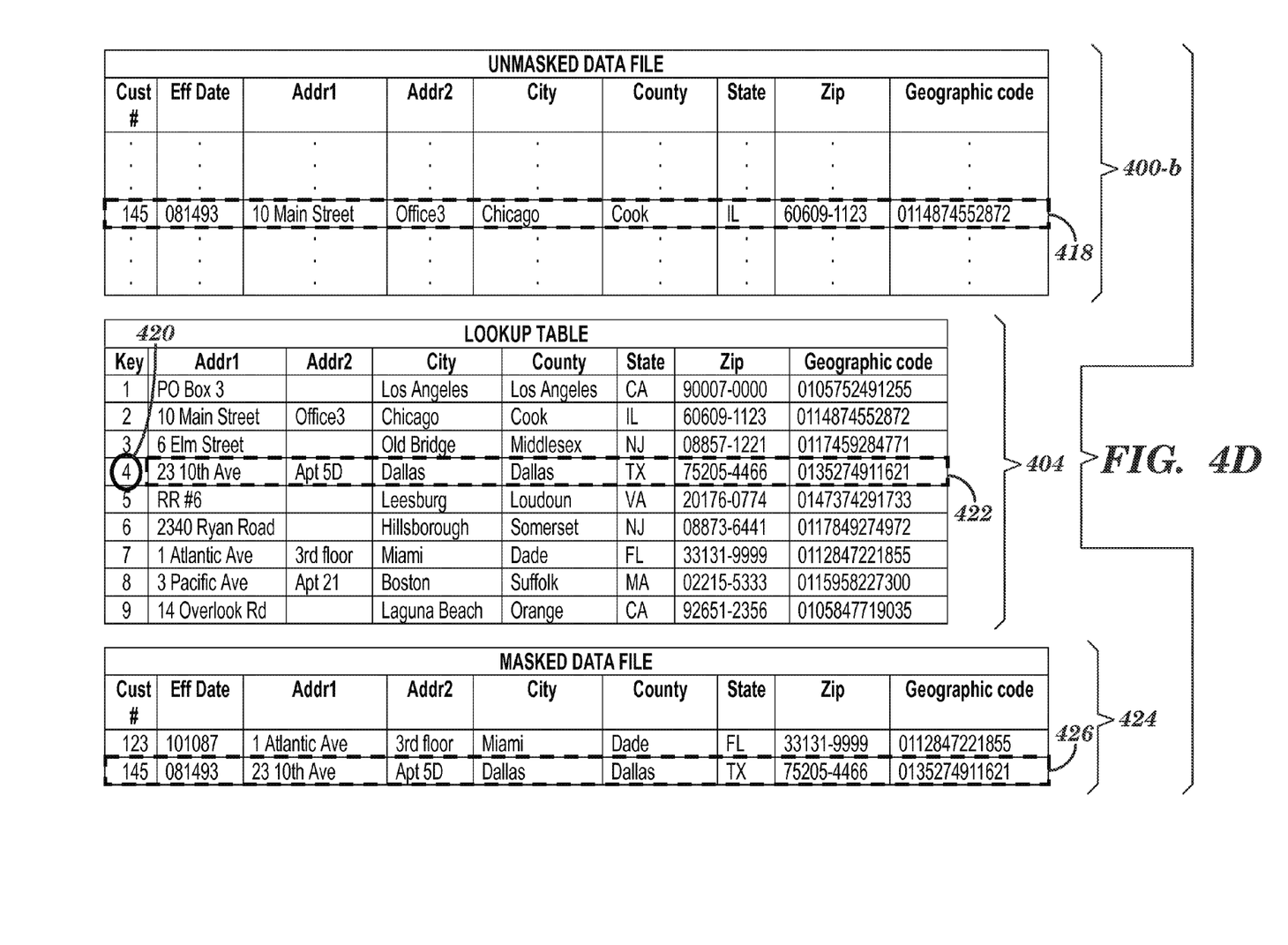
FIG. 4D depicts a replacement of related data group values in a second record of the unmasked data file of FIG. 4A, where the replacement is included in the process of FIG. 3, in accordance with embodiments of the present invention.

FIG. 4D depicts a replacement of related data group values in a second record of the unmasked data file of FIG. 4A, where the replacement is included in the process of FIG. 3, in accordance with embodiments of the present invention. Excerpt 400-b of unmasked data file 400 (see FIG. 4A) shows the second record read by step 302 (see FIG. 3) (i.e., the record corresponding to the customer number of 145), which includes related data group values 418. In step 304 (see FIG. 3), a random number of 4 is generated by random number generator 110 (see FIG. 1) and is received by data masking tool 106 (see FIG. 1). Relational group swap software 112 (see FIG. 1) uses the random number 4 as a key 420 (i.e., index value) to select and retrieve related data group values 422 from lookup table 404 in step 310 (see FIG. 3). The usage of the random number 4 as a key in lookup table 404 is allowed because the random number 4 is not a random number that was previously used in the process of FIG. 3 and the related data group values 422 associated with the random number 4 are not identical to the related data group values 418.

Masked data file 424 includes the record 416 (see FIG. 4C) and is further populated with a second record 426, which is created from the record shown in excerpt 400-b by excluding the related data group values 418 and replacing the excluded related data group values 418 with related data group values 422. Replacing values 418 with values 422 occurs in step 312 (see FIG. 3) and the storing of record 426 in masked data file 424 occurs in step 314 (see FIG. 3).

Figure 4E:
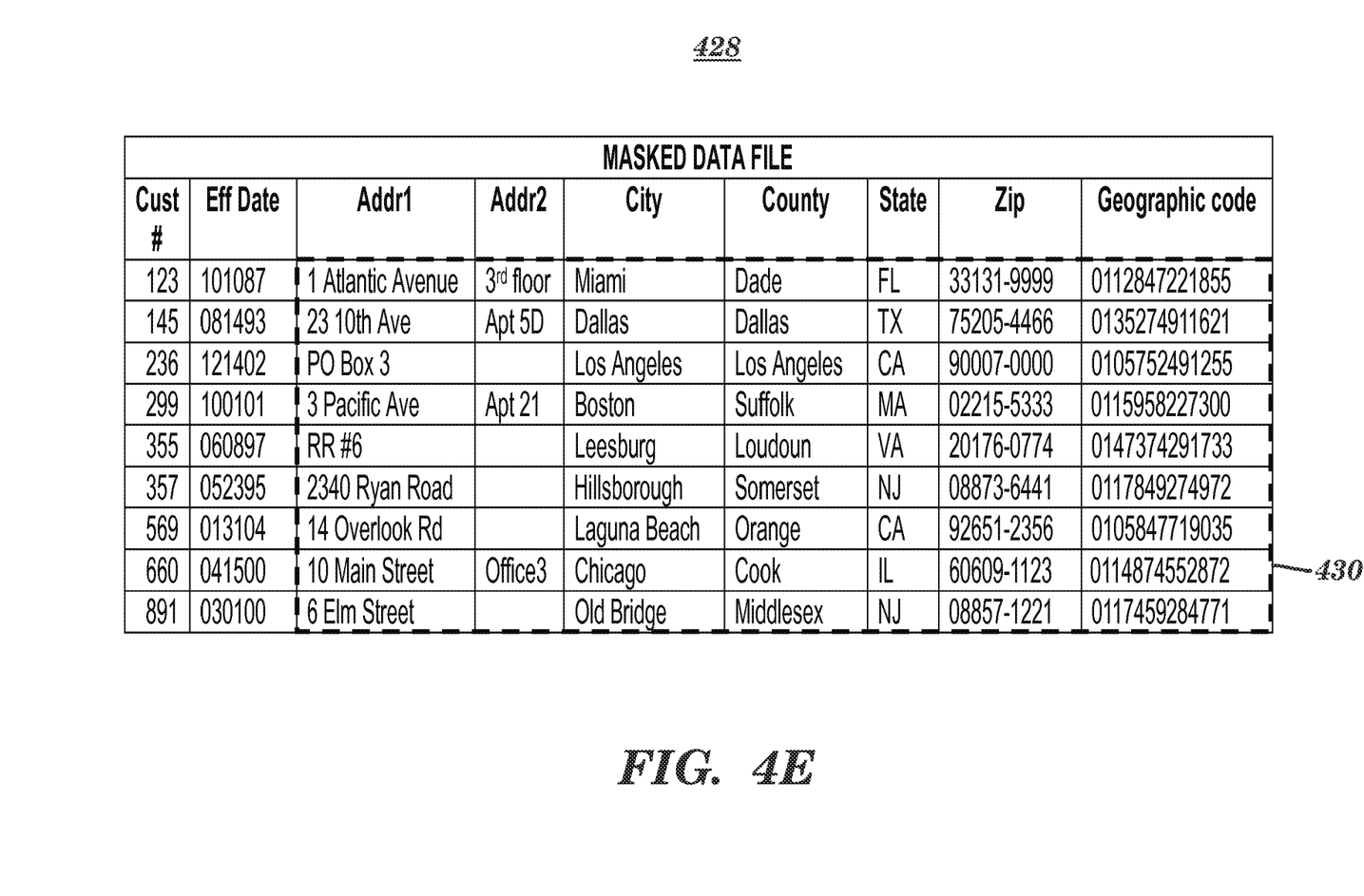
FIG. 4E depicts an exemplary masked data file resulting from the process of FIG. 3 replacing related data group values of the unmasked data file of FIG. 4A, in accordance with embodiments of the present invention.

The process of FIG. 3 continues to repeat steps 302 through 316 until all nine records of unmasked data file 400 (see FIG. 4A) are read and processed, which results in a final version of masked data file 428 in FIG. 4E. Masked data file 428 includes nine sets of related data group values 430, each set in the nine sets 430 being a result of randomly selecting a set of related data group values from the nine sets 402 (see FIG. 4B) in lookup table 404 (see FIG. 4B) to replace a set of related data group values included in the nine sets 402 (see FIG. 4A)

in unmasked data file 400 (see FIG. 4A). As the process described above and illustrated in FIGS. 4A-4E decouples the nine sets of related data group values 430 from the parent data (i.e., Cust # and Eff Date), the nine sets 430 include desensitized data values.

Computing System

Figure 5:
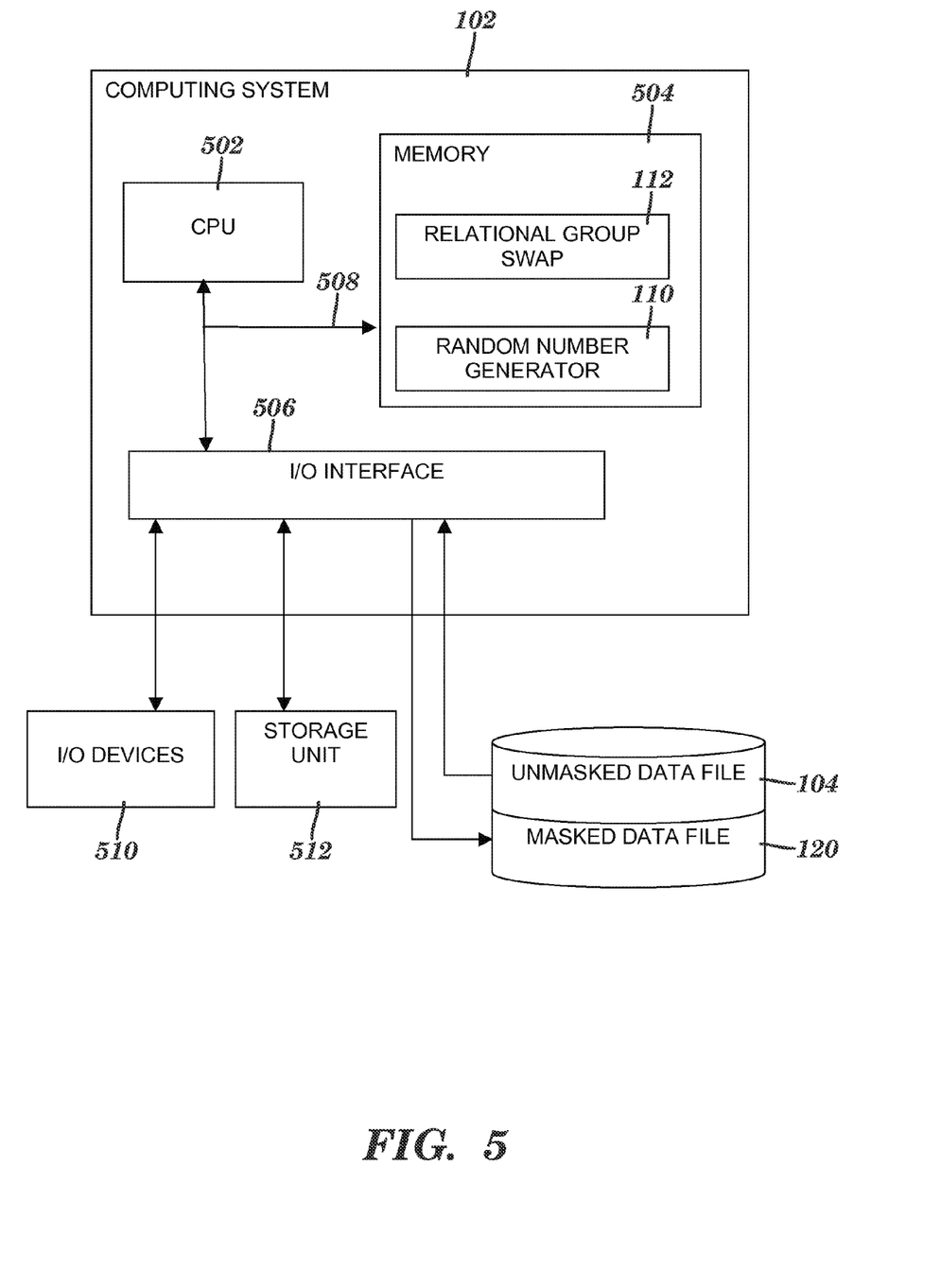
FIG. 5 is a block diagram of a computing system that is included in the system of FIG. 1 and that implements the processes of FIGS. 2 and 3, in accordance with embodiments of the present invention.

FIG. 5 is a block diagram of a computing system that is included in the system of FIG. 1 and that implements the processes of FIGS. 2 and 3, in accordance with embodiments of the present invention. Computing system 102 generally comprises a central processing unit (CPU) 502, a memory 504, an input/output (I/O) interface 506, and a bus 508. Computing system 102 is coupled to I/O devices 510, storage unit 512, unmasked data file 104 and masked data file 120. CPU 502 performs computation and control functions of computing system 102. CPU 502 may comprise a single processing unit, or be distributed across one or more processing units in one or more locations (e.g., on a client and server).

Memory 504 may comprise any known type of data storage and/or transmission media, including bulk storage, magnetic media, optical media, random access memory (RAM), read-only memory (ROM), a data cache, a data object, etc. Cache memory elements of memory 504 provide temporary storage of at least some program code in order to reduce the number of times code must be retrieved from bulk storage during execution. Storage unit 512 is, for example, a magnetic disk drive or an optical disk drive that stores data. Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including but not limited to a display monitor, keyboard, pointing device, speakers, handheld device, printer, facsimile, etc. I/O devices can be coupled to computing system 102 directly or through I/O interface 506. Bus 508 provides a communication link between each of the components in computing system 102, and may comprise any type of transmission link, including electrical, optical, wireless, etc.

I/O interface 506 also allows computing system 102 to store and retrieve information (e.g., program instructions or data) from an auxiliary storage device (e.g., storage unit 512). The auxiliary storage device may be a non-volatile storage device (e.g., a CD-ROM drive which receives a CD-ROM disk). Computing system 102 can store and retrieve information from other auxiliary storage devices (not shown), which can include a direct access storage device (DASD) (e.g., hard disk), a magneto-optical disk drive, a tape drive, or a wireless communication device.

Memory 504 includes program code for relational group swap software 112 and random number generator 110. Further, memory 504 may include other systems not shown in FIG. 5, such as an operating system (e.g., Linux) that runs on CPU 502 and provides control of various components within and/or connected to computing system 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 112 and 110 for use by or in connection with a computing system 102 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic-based, magnetic-based, optical-based, electromagnetic-based, infrared-based, or semiconductor-based system (or apparatus or device). Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of masking a group of related data values. Thus, the present invention discloses a process for supporting computer infrastructure, comprising integrating, hosting, maintaining and deploying computer-readable code into a computing system (e.g., computing system 102), wherein the code in combination with the computing system is capable of performing a method of masking a group of related data values.

In another embodiment, the invention provides a business method that performs the process steps of the invention on a subscription, advertising and/or fee basis. That is, a service provider, such as a Solution Integrator, can offer to create, maintain, support, etc. a method of masking a group of related data values. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of masking a group of related data values, comprising:

reading, by a computing system, a record of a set of n records included in an unmasked data file, wherein said unmasked data file is a set of input to a software application, and wherein said record includes a first plurality of data values of a plurality of data elements included in a related data group and one or more data values of one or more data elements that are external to said related data group, receiving, by said computing system, a randomly generated number k;

retrieving, by said computing system and from a lookup table, a second plurality of data values of said plurality of data elements included in said related data group, wherein said lookup table associates n key values with n pluralities of data values in a one-to-one correspondence, wherein said n pluralities of data values include said second plurality of data values, wherein said n pluralities of data values are included in said n records in a one-to-one correspondence, wherein said retrieving includes identifying said second plurality of data values as being associated with a key value of k included in said n key values;

masking said record by a processor of said computing system, wherein said masking said record includes replacing said first plurality of data values in said record with said second plurality of data values;

initializing, by said computing system, a current record as a first record of said set of n records;

initializing, by said computing system, a current key value as an initial index value;

reading, by said computing system, said current record from said unmasked data file;

extracting, by said computing system, a current plurality of data values from said current record, wherein said current plurality of data values is included in said n pluralities of data values;

assigning, by said computing system, said current key value to said current plurality of data values;

writing, by said computing system, said current key value and said current plurality of values to said lookup table;

updating, by said computing system, said current record as a next record of said set of n records, if said set of n records includes said next record;

modifying, by said computing system, said current key value by a predefined adjustment value, if said set of n records includes said next record; and iteratively repeating, by said computing system, said reading said current record, said extracting said current plurality of data values, said assigning said current key value, said writing said current key value and said current plurality of values, said updating said current record, and said modifying said current key value until said current record is a last record of said set of n records.

2. The method of claim 1, wherein said first plurality of data values is a set of sensitive data values that has a security risk exceeding a predetermined risk level.

3. The method of claim 1, wherein said second plurality of data values is different from said first plurality of data values.

4. The method of claim 1, further comprising:

coupling said first plurality of data values to at least one parent data value, wherein said at least one parent data value is included in said one or more data values of said one or more data elements that are external to said related data group; and decoupling, via said masking, said second plurality of data values from said at least one parent data value, wherein said decoupling results in said second plurality of data values being a set of desensitized data values that has eliminated a security risk associated with said first plurality of data values.

5. The method of claim 1, further comprising determining, by said computing system, said number k is not identical to a random number previously received by said computing system to retrieve a plurality of data values of said plurality of data elements included in said related data group from said lookup table.

6. The method of claim 1, wherein said related data group is a group of related data elements that collectively form a unique piece of data, and wherein said software application is dependent upon said related data group to exercise a task provided by a set of logic in said software application.

7. The method of claim 1, further comprising writing, by said computing system and in response to said masking, said record to a masked data file.

8. A computing system comprising a processor and a computer-readable memory unit coupled to said processor, said memory unit containing instructions that when executed by said processor implement a method of masking a group of related data values, wherein said method comprises:

reading a record of a set of n records included in an unmasked data file, wherein said unmasked data file is a set of input to a software application, and wherein said record includes a first plurality of data values of a plurality of data elements included in a related data group and one or more data values of one or more data elements that are external to said related data group, receiving a randomly generated number k;

retrieving, from a lookup table, a second plurality of data values of said plurality of data elements included in said related data group, wherein said lookup table associates n key values with n pluralities of data values in a one-to-one correspondence, wherein said n pluralities of data values include said second plurality of data values, wherein said n pluralities of data values are included in said n records in a one-to-one correspondence, and wherein said retrieving includes identifying said second plurality of data values as being associated with a key value of k included in said n key values;

masking said record, wherein said masking said record includes replacing said first plurality of data values in said record with said second plurality of data values;

initializing a current record as a first record of said set of n records;

initializing a current key value as an initial index value;

reading said current record from said unmasked data file;

extracting a current plurality of data values from said current record, wherein said current plurality of data values is included in said n pluralities of data values;

assigning said current key value to said current plurality of data values;

writing said current key value and said current plurality of values to said lookup table;

updating said current record as a next record of said set of n records, if said set of n records includes said next record;

modifying said current key value by a predefined adjustment value, if said set of n records includes said next record; and iteratively repeating said reading said current record, said extracting said current plurality of data values, said assigning said current key value, said writing said current key value and said current plurality of values, said updating said current record, and said modifying said current key value until said current record is a last record of said set of n records.

9. The computing system of claim 8, wherein said first plurality of data values is a set of sensitive data values that has a security risk exceeding a predetermined risk level.

10. The computing system of claim 8, wherein said second plurality of data values is different from said first plurality of data values.

11. The computing system of claim 8, wherein said method further comprises:
coupling said first plurality of data values to at least one parent data value, wherein said at least one parent data value is included in said one or more data values of said one or more data elements that are external to said related data group; and
decoupling, via said masking, said second plurality of data values from said at least one parent data value, wherein said decoupling results in said second plurality of data values being a set of desensitized data values that has eliminated a security risk associated with said first plurality of data values.

12. A computer program product, comprising a computer usable storage medium having a computer readable program code stored therein, said computer readable program code containing instructions that when executed by a processor of a computing system implement a method of masking a group of related data values, wherein said method comprises:
reading a record of a set of n records included in an unmasked data file, wherein said unmasked data file is a set of input to a software application, and wherein said record includes a first plurality of data values of a plurality of data elements included in a related data group and one or more data values of one or more data elements that are external to said related data group,
receiving a randomly generated number k;
retrieving, from a lookup table, a second plurality of data values of said plurality of data elements included in said related data group, wherein said lookup table associates n key values with n pluralities of data values in a one-to-one correspondence, wherein said n pluralities of data values include said second plurality of data values, wherein said n pluralities of data values are included in said n records in a one-to-one correspondence, and wherein said retrieving includes identifying said second plurality of data values as being associated with a key value of k included in said n key values;
masking said record, wherein said masking said record includes replacing said first plurality of data values in said record with said second plurality of data values;
initializing a current record as a first record of said set of n records;
initializing a current key value as an initial index value;
reading said current record from said unmasked data file;
extracting a current plurality of data values from said current record, wherein said current plurality of data values is included in said n pluralities of data values;
assigning said current key value to said current plurality of data values;
writing said current key value and said current plurality of values to said lookup table;
updating said current record as a next record of said set of n records, if said set of n records includes said next record;
modifying said current key value by a predefined adjustment value, if said set of n records includes said next record; and
iteratively repeating said reading said current record, said extracting said current plurality of data values, said assigning said current key value, said writing said current key value and said current plurality of values, said updating said current record, and said modifying said current key value until said current record is a last record of said set of n records.

13. The program product of claim 12, wherein said first plurality of data values is a set of sensitive data values that has a security risk exceeding a predetermined risk level.

14. The program product of claim 12, wherein said second plurality of data values is different from said first plurality of data values.

15. The program product of claim 12, wherein said method further comprises:
coupling said first plurality of data values to at least one parent data value, wherein said at least one parent data value is included in said one or more data values of said one or more data elements that are external to said related data group; and
decoupling, via said masking, said second plurality of data values from said at least one parent data value, wherein said decoupling results in said second plurality of data values being a set of desensitized data values that has eliminated a security risk associated with said first plurality of values.

16. The method of claim 1, further comprising:
providing at least one support service for at least one of creating, integrating, hosting, maintaining, and deploying computer-readable code in a computing system, wherein the code in combination with the computing system is capable of performing said reading said record, said receiving said randomly generated number k, said retrieving said second plurality of data values, and said masking said record.

\* \* \* \* \*